United States Patent [19]

Rosa et al.

[11] 4,189,726
[45] Feb. 19, 1980

[54] AUTOMATIC ORIENTATION CIRCUIT INDICATOR DEVICE FOR PORTABLE POWER TOOLS AND THE LIKE

[76] Inventors: Frank Rosa, 91-40 89th St., Woodhaven, N.Y. 11421; Richard L. Miller, 12 Parkside Dr., Dix Hills, N.Y. 11746

[21] Appl. No.: 845,807

[22] Filed: Oct. 27, 1977

[51] Int. Cl.² .............................................. G08B 13/21
[52] U.S. Cl. ...................... 340/689; 33/334; 200/61.52; 200/DIG. 29
[58] Field of Search ............... 340/282, 220, 689, 686; 33/334, 366; 200/61.52, DIG. 29, 52 A

[56] References Cited

U.S. PATENT DOCUMENTS

| | | | |
|---|---|---|---|
| 2,511,525 | 6/1950 | Bradwell et al. | 340/282 |
| 2,825,978 | 3/1958 | Davis | 33/366 |
| 3,752,945 | 8/1973 | Achterberg | 200/DIG. 29 |
| 3,864,839 | 2/1975 | Wolf | 33/334 |

Primary Examiner—Glen R. Swann, III
Attorney, Agent, or Firm—Richard L. Miller

[57] ABSTRACT

A gravity-activated, electric switch rigidly mountable on any type of tool which is to be used in a precisely accurate position respective to a horizontal or vertical plane includes a sealed cylindrical case having an electric contact at each end, a spherical steel ball activated by gravity to freely roll inside the case for making electrical connection between the contacts, the contacts being located so that the gravity-activated ball makes connection therebetween only when the tool is in a precisely accurate position respective to a horizontal or vertical plane.

5 Claims, 5 Drawing Figures

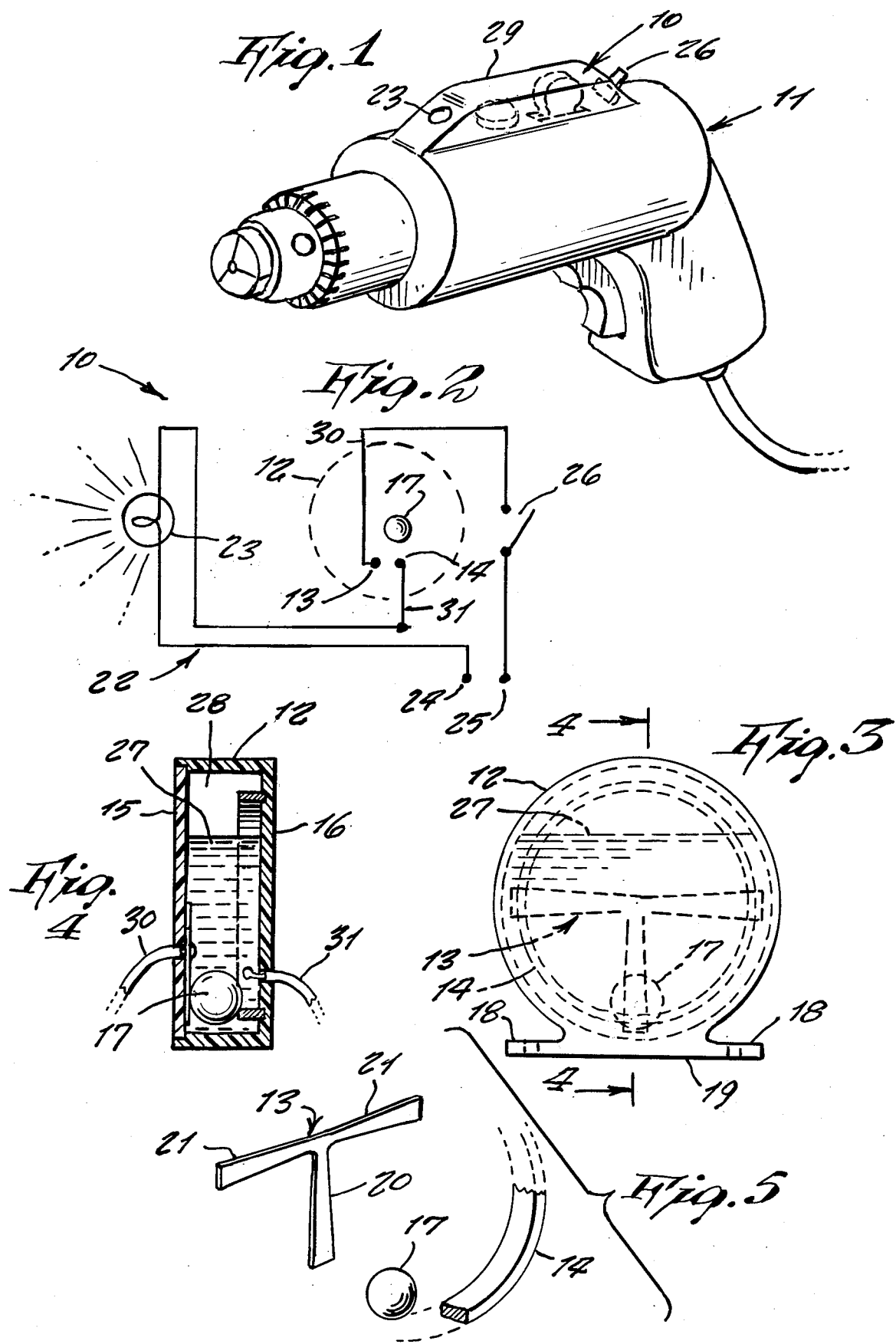

AUTOMATIC ORIENTATION CIRCUIT INDICATOR DEVICE FOR PORTABLE POWER TOOLS AND THE LIKE

BRIEF SUMMARY OF THE INVENTION

This invention relates to level indicating instruments.

A principal object of the present invention is to provide an instrument that is mountable on a tool and which indicates to a person when the tool is in correct position and is not tilted so that the tool performs an accurate work.

Yet a further object is to provide an automatic orientation circuit indicator device which can be mounted on tools such as portable power drills, straight edges, carpenters' levels, and the like.

Yet a further object is to provide an automatic orientation circuit indicator which is not cumbersome so is not in the way for operation of the tool, and which is quick to use without any special skills by a user.

Further objects of the invention will appear as the description proceeds.

FIGURES OF THE DRAWING

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of a portable electric drill shown incorporating two units of the present invention incorporated therein at right angle to each other.

FIG. 2 is an electric circuit of the invention.

FIG. 3 is a side view of one of the units.

FIG. 4 is a cross-section on line 4—4 of FIG. 3.

FIG. 5 is a perspective view of the contacts and contact roller therebetween.

DETAILED DESCRIPTION OF PREFERRED EMBODIMENT

Referring now to the drawing in greater detail, the reference numeral 10 represents an automatic orientation circuit indicator according to the present invention which can be mounted upon any tool such as the portable power drill 11 shown in FIG. 1.

The indicator 10 includes a relatively thin, cylindrical case 12 which contains a copper, T-shaped contact 13 and a copper, ring-shaped contact 14 with opposing end faces, and rigidly secured against opposite end walls 15 and 16 respectively. A spherical shaped steel ball 17 is free to roll inside the case, the ball being of a size so to form an electrical bridge or connection between the stationary contacts 13 and 14.

The case 12 includes sideward extending feet 18 so to form a flat base line 19 placeable against a mounting surface of the tool so that the case is thus rigid respective to the tool.

The T-shaped contact 13 includes a single leg 20 that is vertical respective to the base line, and a pair of opposite extending legs 21 that are horizontal respective to the base line.

Regardless of the rotational position of the indicator 10, the ball, pulled by gravity rests against the ring-shaped contact, but it touches the T-shaped contact only when either of the three legs thereof extend vertically downward in order to close an electric circuit 22 containing an electric lamp 23 so as to illuminate the lamp. The circuit 22 includes terminals 24 and 25 for connection to a power source such as the electrical circuit of the portable power drill which drives a motor so to rotate a drill chuck thereof. The circuit 22 also includes a manually operative switch 26 that serves for selectively placing the indicator into operative use.

It is to be noted that an electrically non-conductive fluid 27 such as oil partly fills the central cavity 28 of the case, and serves as a damper so to slow down a rolling of the ball at a slightest vibration of the tool during use.

The portable power drill 11 is shown including a protrusion 29 on one side of its case, the protrusion enclosing two indicators 10 positioned at right angles to each other so to be selectively used when the drill is utilized either in a vertical or horizontal direction. The protrusion also includes the manual switch 26 on one end and the lamp 23 so that the entire invention does not form a bulky enlargement of the tool.

In operative use, the tool can be used either with or without the indicator. If a person wishes to be sure that a drilled hole will be made precisely accurate horizontally or vertically, he then flips the button of switch 26, and simply observes that the lamp 23 is lighted during the drilling operation.

It is to be noted that the indicator can additionally include means for precisely using a tool at various inclined angles that are most commonly used, such as at 30 degrees, 45 degrees, 60 degrees, and the like. In order that this may be accomplished, the contact 13 would be made with additional legs extending at such inclined angles. Wires 30 and 31 soldered to the contacts extend outward through the case wall for completing the circuit 22.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automatic orientation circuit indicator for portable power tools and the like, comprising in combination, a thin cylindrical case having opposing end walls for sealing the case and defining therewith an interior chamber, a thin-walled cylindrical ring member having opposing end faces, said ring member concentrically positioned against the inside of one end wall and extending into said chamber to form one electrical contact, a thin T-shaped member positioned against the inside of the other end wall, the center of said T-shaped member being coaxial with the center of the cylindrical case and the legs radially extending a distance at least equal to the radius of said cylindrical ring member, said T-shaped member forming another electrical contact, a spherical steel ball freely rotatable within said chamber capable of forming an electrical connection between the interiorly directed end face of the ring member and the remote ends of the legs of the T-shaped member when the indicator is in preselected positions, wiring respectively connected to each of said electrical contacts and extending outwardly through said case and connecting to an electrical circuit including a lamp and a power source.

2. The combination as set forth in claim 1 wherein said case includes a means for rigidly fastening said case on said tool so that said case is correctly positioned respective to a horizontal and vertical plane when said tool is in said planes.

3. The combination as set forth in claim 1, and further comprising a control switch serially interconnected within said wiring for selectively placing the indicator into operative use.

4. The combination as set forth in claim 1, and further comprising a non-conductive fluid which at least partly fills said interior chamber and serves as a damper to the movement of said ball.

5. The combination as set forth in claim 3 and further comprising housing means formed on the power tool for housing the indicator, a first opening in said housing for containing the lamp, and a second opening for receiving the control switch.

* * * * *